United States Patent
Jia et al.

(10) Patent No.: US 7,756,591 B2
(45) Date of Patent: Jul. 13, 2010

(54) SYSTEM FOR OPTIMIZING OXYGEN IN A BOILER

(75) Inventors: Jianhu Jia, Cedar Park, TX (US); Stephen Piche, Austin, TX (US); W. Hardey Beaver, Austin, TX (US)

(73) Assignee: Pegasus Technologies, Inc., Chardon, OH (US)

(*) Notice: Subject to any disclaimer, the term of this patent is extended or adjusted under 35 U.S.C. 154(b) by 1114 days.

(21) Appl. No.: 11/380,084

(22) Filed: Apr. 25, 2006

(65) Prior Publication Data

US 2007/0250215 A1    Oct. 25, 2007

(51) Int. Cl.
G05B 13/02    (2006.01)
(52) U.S. Cl. .................. 700/29; 700/44; 431/10; 110/345
(58) Field of Classification Search .............. 700/29, 700/28, 44, 45, 48; 431/10; 122/448.1; 110/345, 110/347, 188, 234
See application file for complete search history.

(56) References Cited

U.S. PATENT DOCUMENTS

| | | | | |
|---|---|---|---|---|
| 5,167,009 A | | 11/1992 | Skeirik | 395/27 |
| 5,280,756 A | * | 1/1994 | Labbe | 110/191 |
| 5,353,207 A | | 10/1994 | Keeler et al. | 364/164 |
| 5,386,373 A | | 1/1995 | Keeler et al. | 364/577 |
| 5,408,586 A | | 4/1995 | Skeirik | 395/23 |
| 5,825,646 A | | 10/1998 | Keeler et al. | 364/164 |
| 5,832,468 A | * | 11/1998 | Miller et al. | 706/23 |
| 5,933,345 A | | 8/1999 | Martin et al. | 364/164 |
| 6,278,899 B1 | | 8/2001 | Piche et al. | 700/44 |
| 6,289,266 B1 | | 9/2001 | Payson et al. | 700/274 |
| 6,381,504 B1 | | 4/2002 | Havener et al. | 700/44 |
| 6,487,459 B1 | | 11/2002 | Martin et al. | 700/44 |
| 6,678,585 B1 | | 1/2004 | Havener | 700/295 |
| 6,712,604 B2 | | 3/2004 | Havlena | 431/12 |
| 6,725,208 B1 | | 4/2004 | Hartman et al. | 706/23 |
| 6,736,089 B1 | | 5/2004 | Lefebvre et al. | 122/379 |
| 6,944,616 B2 | | 9/2005 | Ferguson et al. | 707/10 |
| 2003/0134241 A1 | * | 7/2003 | Marin et al. | 431/9 |
| 2004/0049300 A1 | * | 3/2004 | Thiele et al. | 700/29 |
| 2004/0191914 A1 | | 9/2004 | Widmer et al. | 436/55 |
| 2004/0249480 A1 | | 12/2004 | Lefebvre et al. | 700/31 |
| 2005/0171880 A1 | | 8/2005 | Lefebvre et al. | 705/35 |
| 2006/0045800 A1 | | 3/2006 | Boyden et al. | 422/62 |
| 2006/0100721 A1 | * | 5/2006 | Piche | 700/47 |

OTHER PUBLICATIONS

Bhat, N., Minderman, P., McAvoy, T., and Wang, N., "Modeling Chemical Process Systems via Neural Computation," *IEEE Control Systems Magazine*, pp. 24-30, Apr. 1990.

(Continued)

*Primary Examiner*—Albert DeCady
*Assistant Examiner*—Steven R Garland
(74) *Attorney, Agent, or Firm*—Kusner & Jaffe

(57) ABSTRACT

A method and apparatus for optimizing air flow to a boiler of a power generating unit using advanced optimization, modeling, and control techniques. Air flow is optimized to maintain flame stability, minimize air pollution emissions, and improve efficiency. An optimizer determines optimal setpoint values for manipulated variables associated with the power generating unit by using a model to minimize the value of a cost function while observing at least one constraint associated with operation of the power generating unit.

22 Claims, 9 Drawing Sheets

OTHER PUBLICATIONS

Barto, A., "Connectionist Learning for Control," in *Neural Networks for Control*, edited by Miller, W., Sutton, R. and Werbos, P., MIT Press, pp. 5-58, 1990.

Widrow, B., and Lehr, M., "Perceptrons, Adalines, and Backpropagation," *Proceedings of the IEEE*, pp. 719-724, Sep. 1990.

Werbos, P., "Backpropagation: Basics and New Developments," *Proceedings of the IEEE*, pp. 134-138, Sep. 1990.

Piche, S., Sayyar-Rodsari, B., Johnson, D., and Gerules, M., "Nonlinear Model Predictive Control Using Neural Networks," *IEEE Control Systems Magazine*, vol. 20, No. 3, Jun. 2000.

Piche, S., and Sabiston, P., "A Disturbance Rejection Based Neural Network Algorithm for Control of Air Pollution Emissions," *Proc. of Int. Joint Conf. on NN*, Montreal, Canada, Aug. 2005.

Bishop, C., "Neural Networks for Pattern Recognition," Chapter 4, Clarendon Press, Oxford, 1995.

Piche, S., "Steepest Descent Algorithm for Neural Network Controller and Filters," *IEEE Trans. on Neural Networks*, vol. 5, No. 2, pp. 198-212, 1995.

Schittkowski, K., and Zillober, C., "Nonlinear Programming," *Encyclopedia of Life Support Systems (EOLSS)*, UNESCO, Topic: Optimization and Operations Research, pp. 157-177, 2003.

James, R., Keisling, D., Lynch, M., and Spinney, P., "Optimization with ProcessLink at the Roanoke Valley Energy Facility," *Proc. of PowerGen 2000*, Orlando, FL, Nov. 2000.

Sanjuan, M., "NOx Control Strategies at City Public Service of San Antonio," *Proc. of Electric Power Conference*, Houston, TX, Apr. 2002.

Partlow, B., Marz, P., Joffrion, V., and Grusha, J., "Experience with Advanced Controls when Combined with an Ultra Low NOx Combustion System," *Proc. of PowerGen*, 2003.

Piche, S., Jia, J., and Johnson, R., "Sustaining NOx Emission Reductions," *Proc. of Electric Power*, Atlanta, GA, 2006.

Runkle, D., Chapa, R., Labbe, D., and Morrow, A., "Sim Gideon Station: Multi Variable Control for Enhanced Dispatch and NOx Mitigation," *ISA—The Instrumentation, Systems, and Automation Society, 13$^{th}$ Annual Joint ISA POWID/EPRI Controls and Instrumentation Conference*, Jun. 2003, Paper #TP03POW066.

U.S. Appl. No. 10/985,705, filed Nov. 10, 2004, Kosvic et al., entitled: System for Optimizing a Combustion Heating Process.

U.S. Appl. No. 11/053,734, filed Feb. 8, 2005, Wroblewski et al., entitled: Method and Apparatus for Optimizing Operation of a Power Generating Plant Using Artificial Intelligence Techniques.

U.S. Appl. No. 11/301,034, filed Dec. 12, 2005, Wroblewski et al., entited: Model Based Control and Estimation of Mercury Emissions.

\* cited by examiner

SYSTEM FOR OPTIMIZING OXYGEN IN A BOILER

FIELD OF THE INVENTION

The present invention relates generally to the operation of a power generating unit, and more particularly to a method and apparatus for optimizing the air flow to a boiler of a power generating unit using advanced optimization, modeling, and control techniques to maintain flame stability, minimize air pollution emissions, and improve efficiency.

BACKGROUND OF THE INVENTION

In a conventional fossil fuel-fired (e.g., coal-fired) power generating unit, a fossil fuel/air mixture is ignited in a boiler. Large volumes of water are pumped through tubes inside the boiler, and the intense heat from the burning fuel turns the water in the boiler tubes into high-pressure steam. In an electric power generating application, the high-pressure steam from the boiler passes into a turbine comprised of a plurality of turbine blades. Once the steam hits the turbine blades, it causes the turbine to spin rapidly. The spinning turbine causes a shaft to turn inside a generator, creating an electric potential.

As used herein, the term "power generating plant" refers to one or more power generating units. Each power generating unit drives one or more turbines used for generating electricity. A power generating unit is typically powered by fossil fuels (including but not limited to, coal, natural gas or oil), and includes a boiler for producing high temperature steam; air pollution control (APC) devices for removal of pollutants from flue gas; a stack for release of flue gas; and a water cooling system for condensing the high temperature steam. A typical power generating unit will be described in detail below.

Boiler combustion or other characteristics of a fossil fuel-fired power generating unit are influenced by dynamically varying parameters of the power generating unit, including, but not limited to, air-to-fuel ratios, operating conditions, boiler configuration, slag/soot deposits, load profile, fuel quality and ambient conditions. Changes to the business and regulatory environments have increased the importance of dynamic factors such as fuel variations, performance criteria, emissions control, operating flexibility and market driven objectives (e.g., fuel prices, cost of emissions credits, cost of electricity, etc.).

Over the past decade, combustion optimization systems have been implemented for advanced control of the combustion process within the furnace. Typically, combustion optimization systems interface with a distributed control system (DCS) of a power generating unit. Based upon the current operating conditions of the power generating unit, as well as a set of operator specified goals and constraints, the combustion optimization system is used to compute the optimal fuel-to-air staging within the furnace to achieve the desire goals and constraints.

Combustion optimization systems were originally implemented to reduce nitrogen oxides (NOx) produced in the furnace and emitted to the atmosphere via the stack. U.S. Pat. No. 5,280,756 to Labbe et al. (issued Jan. 25, 1994) teaches a method and system for controlling and providing guidance in reducing NOx emissions based upon controllable combustion parameters and model calculations while maintaining satisfactory plant performance. U.S. Pat. No. 5,386,373 to Keeler et al. (issued Jan. 31, 1995) teaches the use of a predictive model of emissions including NOx in conjunction with a control system. U.S. Pat. No. 6,381,504 to Havener et al. (issued Apr. 30, 2002) describes a method for optimally determining the distribution of air and fuel within a boiler by aggregating the distributions of air and fuel into two common variables, performing an optimization, and then computing the optimal distribution of fuel and air based upon the optimal values of the aggregated variables. U.S. Pat. No. 6,712,604 issued to Havlena (issued Mar. 30, 2004) describes a system for controlling the combustion of fuel and air in a boiler such that the distributions of NOx and CO are maintained to average less than the maximum permitted levels.

Recently, combustion optimization approaches have been used to control boiler parameters in addition to NOx, including unit heat rate, boiler efficiency, and mercury emissions. U.S. patent application Ser. No. 10/985,705 (filed Nov. 10, 2004) entitled "System for Optimizing a Combustion Heating Process" (fully incorporated herein by reference) teaches an approach to modeling controllable losses in a power generating unit and a method for optimizing the combustion process based upon these controllable losses. U.S. patent application Ser. No. 11/301,034 (filed Dec. 12, 2005) entitled "Model Based Control and Estimation of Mercury Emissions" (fully incorporated herein by reference) teaches a system and method for reducing mercury emissions from a coal-fired power plant while observing limits on the amount of carbon in the fly ash produced by the combustion process.

The combustion optimization approaches described above provide high level control of the boiler similar to that performed by the operator. The combustion optimization system relies upon the Distributed Computer System (DCS) to execute its commands. For example, the DCS is typically used to control the level of oxygen in the furnace, the position of air flow dampers, and the amount of fuel entering the power generating unit. It is assumed that the DCS, typically using a design of cascading and interacting proportional, integral and derivative (PID) control, provides a sufficiently accurate and fast control of the basic control loops in the boiler. Thus, the combustion optimization system is used to compute the optimal setpoints for the boiler and the DCS is used to provide accurate and fast control of the basic loops to these setpoints.

Although the DCS is typically capable of providing adequate regulatory control of the power generating unit, there are a significant number of situations where a DCS based control scheme is not sufficient for maintaining the appropriate operating conditions in the boiler. For example, large variations in the heat content of the fuel and inaccurate oxygen sensor readings can lead to flame extinction of burners using typical DCS control schemes. If large fuel variations or inaccurate oxygen readings are known to exist, operators are required to either manually control the boiler or use artificially high levels of oxygen to prevent flame extinction. Either method leads to sub-optimal performance of the boiler.

Variations in heat content of the fuel can lead to flame extinction or flame instability of burners due to inadequate air flow. Specifically, as the heat content of the fuel changes, the method in which air is injected into the boiler varies. Two streams of air (i.e., primary air and secondary air) are used for injecting air into the boiler. (For ease of explanation in this background section, a boiler without overfire air is considered.) The primary air is used to transport coal to the burners. The secondary air is used to provide excess oxygen (i.e., oxygen introduced into the boiler above that required for full combustion of the fuel) and to swirl around the primary air and fuel inside the burner. The flow of secondary air around the primary air is critical to maintaining proper flame and combustion characteristics in the boiler. The total amount of both primary air and secondary air injected into the boiler is determined by load demand and the required oxygen at the exit of the furnace.

As the heat content of the fuel varies, the amount of primary air needed to transport the fuel to a burner changes. If the heat content drops, more fuel is needed, and consequently more primary air is needed to transport the fuel. Therefore, a lower rank fuel requires more primary air than a higher rank fuel. Since the overall amount of total air typically injected into the boiler stays approximately constant at a fixed load, the secondary air that is injected into the burner varies as the primary air varies to maintain constant total air. As the heat content of the fuel decreases, primary air increases resulting in a decrease in secondary air. At some point, if the heat content falls too low, flame extinction of the burner becomes highly probable due to the lack of sufficient secondary air. Because it is difficult and expensive to instantaneously determine the heat content of the fuel using sensors, it is difficult to create an algorithm to recognize this situation in the DCS using commonly available logic and control schemes. Therefore, current DCS logic and control schemes can lead to the high probability of flame extinction if the heat content of the fuel is significantly lower than expected.

A second cause of flame instability or extinction is inaccurate oxygen measurements in the boiler. In this regard, one or more oxygen sensors are located in the furnace where combustion is complete to measure oxygen concentration in the flue gas. It should be appreciated that the measured oxygen concentration is also indicative of "excess oxygen" since a percentage value for excess oxygen can be determined from the measured oxygen concentration. If the oxygen sensors produce a higher than actual reading of oxygen concentration (indicative of higher levels of excess oxygen), the DCS will be forced to lower secondary air to the boiler. Once again, if the secondary air falls too low, flame extinction becomes highly probable. Therefore, an artificially high reading of oxygen from the sensors in the furnace can lead to flame extinction using current DCS control schemes.

To avoid these problems, prior to the invention disclosed herein, operators of power generating units have had two options:

1) Manual Control: The operator directly controls the secondary air rather than using a PID control loop for maintaining the level of oxygen in the furnace. Using this approach, the operator must constantly monitor a variety of boiler operating conditions such as the excess oxygen in the furnace, the fuel entering the furnace, and the amount of secondary air. If the secondary air becomes too low to maintain proper flame stability, due either to low heat content of the fuel or drift in the oxygen sensors or a combination of these factors, the operator must manually increase the amount of secondary air to prevent flame extinction. (This subsequently increases the oxygen in the boiler.) This approach requires constant operator attention to prevent flame extinction. Because it is difficult to maintain constant attention, many operators choose the second option which is described hereinafter.

2) Artificially High Setpoint for Oxygen: A second approach to prevent flame extinction, due either to low heat content of the fuel or drift in the oxygen sensors or a combination of both, is to use an artificially high setpoint for oxygen in the furnace. Using this approach, the operator sets the oxygen at a level such that under any circumstances the secondary air will be sufficient to prevent flame extinction. Although this approach is simple and can be implemented by current DCS systems, it has serious drawbacks. High levels of oxygen in the boiler lead to formation of high levels of nitrogen oxides (NOx) in the boiler. Because NOx is a major regulated air pollutant, this approach leads to unwanted and unnecessary air pollution. In addition, an increase in the oxygen also leads to a decrease in overall efficiency of the boiler. Therefore, setting an artificially high value for oxygen does prevent flame extinction and is possible using current DCS control schemes; however, it leads to excess air pollution and a reduction in overall power generating unit efficiency.

The existing solutions to the foregoing problems are not suitable for use with a combustion optimization system. In this regard, to properly implement a combustion optimization system all critical control loops, such as oxygen, must be under automatic control. Therefore, the first approach, which relies on manual control of excess oxygen, cannot be used in conjunction with a combustion optimization system. The second approach may be used in conjunction with a combustion optimization system but places an artificially high constraint on the lower level of oxygen in the boiler. Since most combustion optimization systems are installed to improve heat rate or decrease NOx, lowering excess oxygen in the boiler below this artificially high constraint is critical to the success of such systems. Therefore, an alternative approach for control of excess oxygen is needed. This alternative approach would have significant environmental and economic benefits whether it is used in conjunction with a combustion optimization system or used without such a system.

The present invention provides a system that overcomes the abovementioned drawbacks of the prior art, and provides advantages over prior art approaches to control and optimization of power generating units.

SUMMARY OF THE INVENTION

In accordance with the present invention, there is provided a control system for controlling oxygen in flue gas produced by a boiler for a fossil fuel fired power generating unit, said control system comprising: (a) means for receiving data signals from a plurality of sensors for sensing parameters associated with operation of the power generating unit; (b) a model for predicting oxygen in the flue gas produced by the boiler, the model comprising: a plurality of inputs for receiving input values associated with manipulated variables and disturbance variables associated with the power generating unit, and one or more outputs for providing output values associated with controlled variables, at least one output providing a first output value indicative of predicted oxygen in the flue gas in accordance with the input values; (c) an optimizer for determining optimal setpoint values for the manipulated variables using the model, wherein said optimal setpoint values for the manipulated variables produce optimal air flow into the boiler; and (d) means for controlling operation of the power generating unit using the optimal setpoint values for the manipulated variables.

In accordance with another aspect of the present invention, there is provided a method for controlling oxygen in flue gas produced by a boiler for a fossil fuel fired power generating unit, said method comprising: (a) receiving data signals from a plurality of sensors for sensing parameters associated with operation of the power generating unit; (b) using a model to predict oxygen in the flue gas produced by the boiler, the model comprising: a plurality of inputs for receiving input values associated with manipulated variables and disturbance variables associated with the power generating unit, and one or more outputs for providing output values associated with controlled variables, at least one output providing a first output value indicative of predicted oxygen in the flue gas in accordance with the input values; (c) determining optimal setpoint values for the manipulated variables using the model, wherein said optimal setpoint values for the manipulated variables produce optimal air flow into the boiler; and (d) controlling operation of the power generating unit using the optimal setpoint values for the manipulated variables.

According to still another aspect of the present invention, there is provided a control system for controlling a parameter associated with operation of a fossil fuel fired power generating unit, said control system comprising: (a) means for receiving data signals from a plurality of sensors for sensing the parameter associated with operation of the power generating unit, said plurality of sensors located in different regions of the power generating unit; (b) an optimization system comprising: (1) a model for predicting the parameter sensed by the plurality of sensors, the model comprising: a plurality of inputs for receiving input values associated with manipulated variables and disturbance variables associated with the power generating unit, and a plurality of outputs for providing a plurality of output values associated with controlled variables, said plurality of output values indicative of predicted values for the parameter sensed by the plurality of sensors, wherein each of said plurality of output values is respectively associated with each of said plurality of sensors; (2) an optimizer for determining optimal setpoint values for the manipulated variables using the model, said optimal setpoint values determined by the optimizer in accordance with at least one goal and at least one constraint associated with operation of the power generating unit; and (c) means for controlling operation of the power generating unit using the optimal setpoint values for the manipulated variables.

According to yet another aspect of the present invention, there is provided a method for controlling a parameter associated with operation of a fossil fuel fired power generating unit, said method comprising: (a) receiving data signals from a plurality of sensors for sensing the parameter associated with operation of the power generating unit, said plurality of sensors located in different regions of the power generating unit; (b) optimizing operation of the fossil fuel fired power generating unit using an optimization system comprising: (1) a model for predicting the parameter sensed by the plurality of sensors, the model comprising: a plurality of inputs for receiving input values associated with manipulated variables and disturbance variables associated with the power generating unit, and a plurality of outputs for providing a plurality of output values associated with controlled variables, said plurality of output values indicative of predicted values for the parameter sensed by the plurality of sensors, wherein each of said plurality of output values is respectively associated with each of said plurality of sensors; and (2) an optimizer for determining optimal setpoint values for the manipulated variables using the model, said optimal setpoint values determined by the optimizer in accordance with at least one goal and at least one constraint associated with operation of the power generating unit; and (c) controlling operation of the power generating unit using the optimal setpoint values for the manipulated variables.

According to yet another aspect of the present invention, there is provided a control system for controlling operation of a fossil fuel fired power generating unit, said control system comprising: (a) means for receiving data signals from a plurality of sensors for sensing parameters associated with operation of the power generating unit; (b) a combustion optimization system for determining optimal setpoint values for manipulated variables associated a combustion process of the fossil fuel fired power generating unit, (c) an oxygen optimization system for determining optimal setpoint values for manipulated variables associated with air flow for the combustion process; (d) means for controlling operation of the power generating unit using optimal setpoint values for manipulated variables as determined by the combustion optimization system and the oxygen optimization system.

An advantage of the present invention is the provision of a control system including an oxygen optimization system for optimizing oxygen in a power generating unit.

Another advantage of the present invention is the provision of a control system including an oxygen optimization system that controls air flow to the boiler.

Still another advantage of the present invention is the provision of a control system including an oxygen optimization system that prevents flame instability and flame extinction.

Yet another advantage of the present invention is the provision of a control system that includes a combustion optimization system and an oxygen optimization system.

These and other advantages will become apparent from the following description of a preferred embodiment taken together with the accompanying drawings and the appended claims.

BRIEF DESCRIPTION OF THE DRAWINGS

The invention may take physical form in certain parts and arrangement of parts, a preferred embodiment of which will be described in detail in the specification and illustrated in the accompanying drawings which form a part hereof, and wherein.

DETAILED DESCRIPTION OF THE INVENTION

Figure 1:
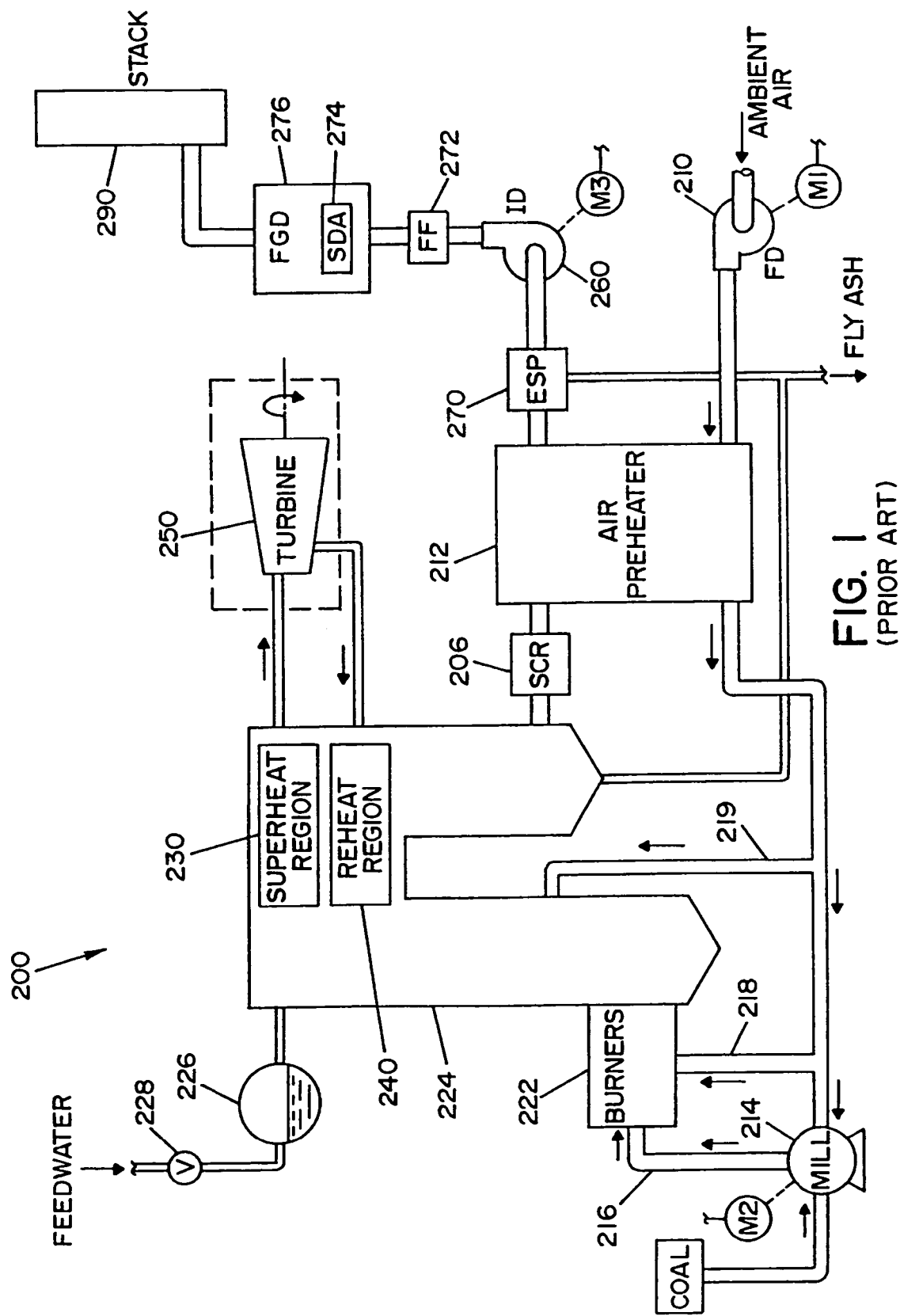
FIG. 1 shows a simplified schematic of a typical coal-fired power generating unit.

It should be understood that the various systems described in the illustrated embodiments of the present invention may take the form of computer hardware, computer software, or combinations thereof. The computer hardware may take the form of a conventional computer system including a processor, data storage devices, input devices (e.g., keyboard, mouse, touch screen and the like), and output devices (e.g., display devices such as monitors and printers), or be embodied as part of another computer system.

Furthermore, the specific inputs and outputs of each model disclosed herein are shown solely for the purpose of illustrating an embodiment of the present invention. In this regard, it is contemplated that the specific model inputs and outputs may vary according to the requirements of the model and the desired predicted values that are being determined by the model.

The present invention is described herein with reference to power generating units for the generation of electric power. However, it is contemplated that the present invention is also applicable to other applications, including, but not limited to, steam generating units for generation of steam.

Power Generating Unit

The main components of a typical fossil fuel fired power generating unit 200 will now be briefly described with reference to FIG. 1. Power generating unit 200 includes one or more forced draft (FD) fans 210 that are powered by motors M1. Forced draft fans 210 supply air to mills 214 and to burners 222, via an air preheater 212. Ambient air is heated as it passes through air preheater 212. Mills 214 include pulverizers that are powered by motors M2. The pulverizers grind coal (or other fuel) into small particles (i.e., powder). FD fans 210 provide primary air to mills 214 to dry and carry the coal particles to burners 222 via a primary air pathway 216. FD fans 210 also provide secondary air to burners 222 via a secondary air pathway 218. Air from FD fans 210 that is supplied to burners 222 facilitates combustion of the coal. In the illustrated embodiment, air from FD fans 210 also supplies overfire air (OFA) to furnace 224 above the combustion zone, via an overfire air (OFA) pathway 219. The overfire air reduces formation of nitrogen oxides (NOx). Hot flue gas is drawn out of furnace 224 by one or more induced draft (ID) fans 260, and delivered to the atmosphere though a chimney or stack 290. Induced draft fans 260 are powered by motors M3.

Water is supplied to a drum 226 by control of a feedwater valve 228. The water in drum 226 is heated by furnace 224 to produce steam. This steam is further heated in a superheat region 230 by a superheater (not shown). A superheater spray unit (not shown) can introduce a small amount of water to control the temperature of the superheated steam. A temperature sensor (not shown) provides a signal indicative of the sensed temperature of the superheated steam. Superheated steam produced by power generating unit 200 is supplied to a turbine 250 that is used to produce electricity. Steam received by the turbine is reused by circulating the steam through a reheater (not shown) that reheats the steam in a reheat region 240. A reheater spray unit (not shown) can introduce a small amount of water to control the temperature of the reheated steam. A temperature sensor (not shown) provides a signal indicative of the sensed temperature of the reheated steam.

A "boiler" includes, but is not limited to, burners 222, furnace 224, drum 226, superheater, superheater spray unit, reheater, reheater spray unit, mills 214, and a boiler economizer (not shown). The boiler economizer recovers "waste heat" from the boiler's hot stack gas and transfers this heat to the boiler's feedwater.

In addition, power generating unit 200 includes some form of post-combustion air pollution control (APC) equipment for removing pollutants from the flue gas. The APC equipment may include, but is not limited to, a selective catalytic reactor (SCR) 206, an electro-static precipitator (ESP) 270, a fabric filter (FF) 272, a spray dry absorber (SDA) 274, and a wet flue gas desulfurization (FGD) system 276.

A typical power generating unit also includes additional components well known to those skilled in the art, including, but not limited to, tubes for carrying fluids, valves, dampers, windbox, sensing devices for sensing a wide variety of system parameters (including, but not limited to, temperature, pressure, flow rate, and flue gas components), and actuators for actuating components such as valves and dampers.

It should be understood that FIG. 1 illustrates one configuration for supplying primary air (PA) and secondary air (SA) to burners 222. In this regard forced draft fan 210 is used to supply both the primary air and secondary air to burners 222 via respective primary air and secondary air pathways 216, 218. The split between the amount of primary air and secondary air is controlled by a series of dampers and possibly by an exhauster fan connected to mills 214. It should be appreciated that in an alternative configuration commonly used in power generation units, the supply of primary air and secondary air to the burners is controlled by separate fans. In this respect, a primary air fan is used to control the supply of primary air, while the forced draft fan is used to control the supply of secondary air.

While the present invention will be described herein with reference to power generating unit 200 as shown in FIG. 1, it is recognized that different mechanical systems can be used to supply primary and secondary air. Accordingly, it is contemplated that the present invention may be implemented in connection with a variety of different types of mechanical systems for delivery of primary and secondary air in a power generating unit.

DCS Control of Primary and Secondary Air

Figure 2:
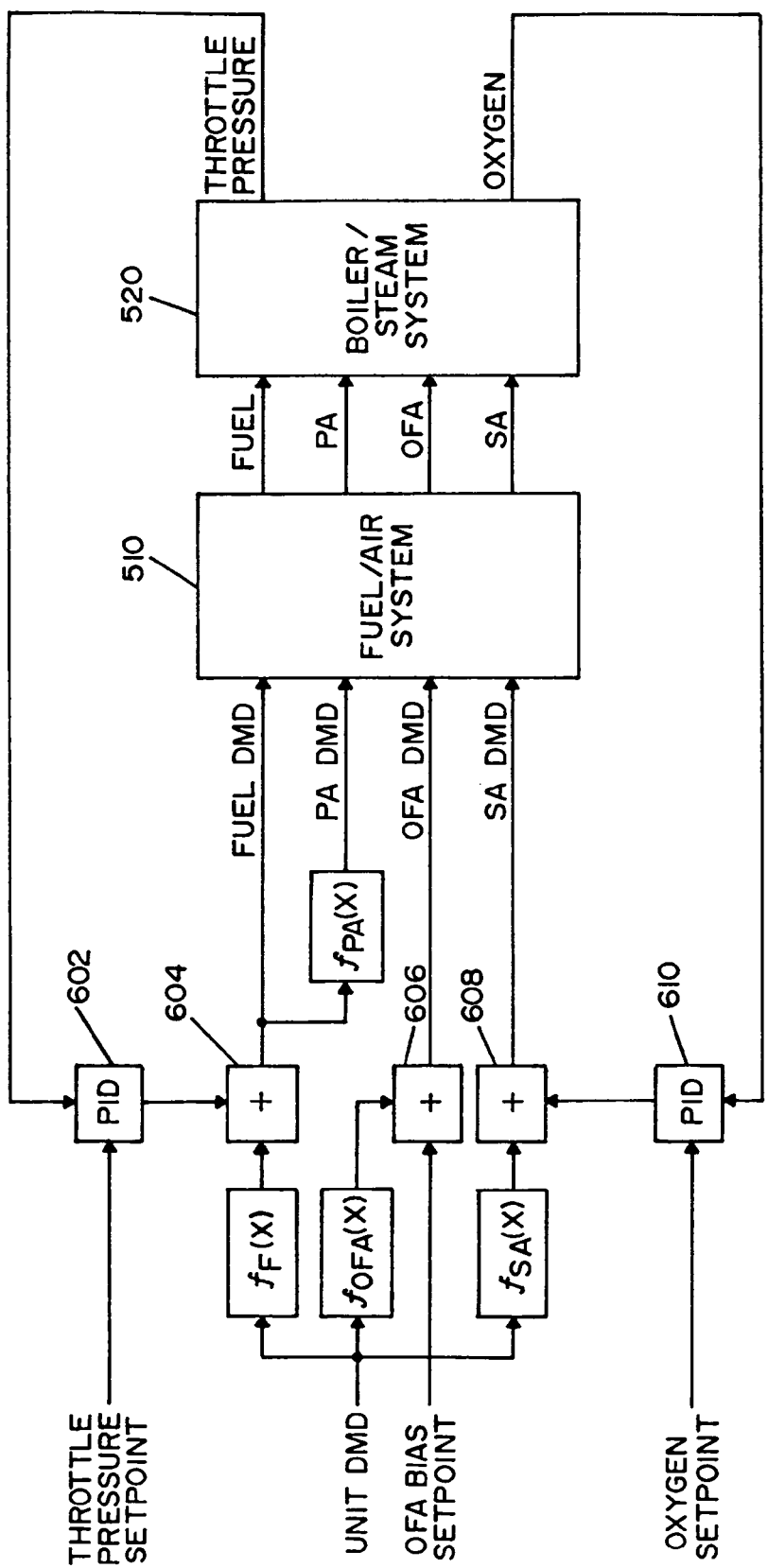
FIG. 2 shows a typical control system for fuel and air in a boiler.

FIG. 2 illustrates a typical control scheme implemented in a Distributed Control System (DCS) for control of fuel, primary air, overfire air, and secondary air. It should be noted that FIG. 2 is a generalized version of a control system and a number of variations of the control scheme are implement on utility boilers. However, FIG. 2 serves herein as a representative example of such control schemes.

As shown in FIG. 2, the unit load demand (Unit DMD) and the throttle pressure setpoint of the turbine are used to control the amount of fuel and primary air entering the boiler. Unit DMD is input to function calculation block, $f_F(x)$, that is used to compute the expected amount of fuel needed to maintain the boiler at the Unit DMD. A Proportional, Integral and Derivative (PID) control loop 602 for the throttle pressure is used to trim the fuel demand via addition block 604. The output of addition block 604 is the fuel demand (Fuel DMD) for fuel/air system 510. Fuel/air system 510 includes the components of power generating unit 200 that are associated with supplying fuel and air (i.e., oxygen) to the boiler. These components include, but are not limited to such components as described above in connection with FIG. 1 (e.g., fans, dampers, valves, conduits, etc.).

Fuel DMD is used to compute the primary air demand (PA DMD) using function calculation block, $f_{PA}(x)$. This function calculation block is used to compute the amount of primary air needed to transport the fuel (i.e., pulverized coal) to the burners.

The overfire air demand (OFA DMD) is computed by summing the output of function calculation block $f_{OFA}(x)$ and an OFA bias setpoint. Unit DMD is input into function calculation block, $f_{OFA}(x)$, to compute a recommended overfire air (OFA) setpoint. The function, $f_{OFA}(x)$, is typically set during commissioning of the overfire air system or determined by engineers during boiler tuning. The operator may bias the results of the function block using the OFA bias setpoint. In this respect, the output of addition block 606 is the overfire air demand (OFA DMD). As illustrated in FIG. 2, only one OFA bias setpoint signal is shown; however, there are often multiple overfire air dampers, and thus multiple OFA bias setpoint signals.

Using the control scheme shown in FIG. 2, the oxygen at the exit of the furnace is controlled using the secondary air. The expected secondary air given the unit demand (Unit DMD) is computed using function calculation block, $f_{SA}(x)$. The result of this function calculation is trimmed using oxygen PID control loop 610. Accordingly, addition block 608 outputs the summation of the outputs of oxygen PID control loop 610 and function calculation block $f_{SA}(x)$, which is the secondary air demand (SA DMD) for fuel/air system 510.

As shown in FIG. 2, fuel/air system 510 is used to deliver the required amounts of fuel and air to boiler/steam system 520. Boiler/steam system 520 includes components of power generating unit 200 that are used in the production of steam to drive turbine 250. These components include, but are not limited to, such components described above in connection with FIG. 1.

It should be noted that the fuel demand (i.e., Fuel DMD) and air demands (i.e., PA DMD, OFA DMD, and SA DMD) of FIG. 2 may represent multiple signals. For example, the fuel demand includes signals associated with each of the mills. In addition, the primary air demand, overfire air demand, and secondary air demand include multiple signals associated with the various dampers and fans that are associated with control of systems 510 and 520.

Given the fuel and air demand in FIG. 2, in one embodiment, the fuel/air system 510 is implemented as follows: injection of primary air into the boiler is controlled by a primary air fan. The fuel is controlled by feeder speed in the various mills. The flow of secondary air into the boiler is controlled by forced draft fan and secondary air dampers located at the entrance to the windbox. Thus, in the illustrated embodiment the primary air demand (PA DMD) is used to set a discharge pressure of the primary air fan; the fuel demand (Fuel DMD) is used to set feeder speeds among various mills; the secondary air demand (SA DMD) is used to set a discharge pressure of the forced draft fan and damper positions of secondary air dampers; and the overfire air demand (OFA DMD) is used to set additional damper positions. PA DMD, OFA DMD and SA DMD may be quantitatively expressed as a percentage value indicative of the percentage that a valve or other component is opened or actuated.

It should be appreciated that primary air, overfire air and secondary air can be quantified in terms of a flow rate (e.g., volume per unit time) or a percentage of a maximum flow rate.

The control scheme of FIG. 2 responds to changes in the heat content of fuel in the following manner. If the heat content of the fuel decreases, the throttle pressure will also decrease. The output of throttle pressure PID control loop 602 will increase to compensate for the drop in throttle pressure. This results in both an increase in the Fuel DMD and PA DMD signals. The fuel/air system 510 will increase the fuel and primary air entering the boiler/steam system 520. Using the foregoing approach, the throttle pressure will be controlled to the desired setpoint.

The increase in primary air due to the decrease in heat content of the fuel will cause the oxygen at the exit of the furnace to increase, which is indicative of an increase in "excess oxygen." Oxygen PID control loop 610 will respond by decreasing the secondary air. Thus, the total overall effect of lower heat content in the fuel is a decrease in secondary air which may potentially lead to flame instability or extinction.

A second source of potential flame instability is a drift in the measured oxygen values provided by oxygen sensors. Oxygen sensors are placed in the back-pass of the furnace in order to measure the concentration of oxygen (i.e., "oxygen level" or "amount of oxygen") in the flue gas remaining after combustion. Accordingly, the measured oxygen concentration is indicative of "excess oxygen," since a percentage value for excess oxygen can be determined from the measured oxygen concentration. The level of oxygen has a large effect on a number of important combustion characteristics including the NOx and CO emissions, water-wall wastage, and boiler efficiency. Therefore, it is critical to accurately measure the level of oxygen in the flue gas.

Typically, multiple oxygen sensors are placed in the back-pass of the furnace to measure the oxygen level at different locations. The resulting measurements are often combined using simple logic, such as averaging to form one value for oxygen. This oxygen level measurement is then used in oxygen PID control loop 610.

Multiple measurements of oxygen are also taken because the oxygen sensors are prone to drift and errors, especially if the oxygen sensors are not properly maintained. By averaging or eliminating an oxygen sensor that appears to be inaccurate, the error in the measurement of oxygen can be reduced.

However, despite multiple oxygen measurements, it is possible that inaccurate measurements of oxygen are used in oxygen PID control loop 610 of FIG. 2. If the oxygen sensors produce a measured oxygen level that is higher than the actual oxygen level, oxygen PID control loop 610 of FIG. 2 will lower the secondary air demand (SA DMD).

As previously described in the background section, a significant drop in secondary air can significantly increase the probability of flame extinction. At some point as the secondary air is lowered, whether due to lower heat content in the fuel or an inaccurate reading of oxygen, the probability of flame extinction becomes unacceptably large. To prevent flame extinction, the operator may choose to increase the oxygen setpoint which results in higher levels of NOx emissions and reductions in boiler efficiency.

Figure 3:
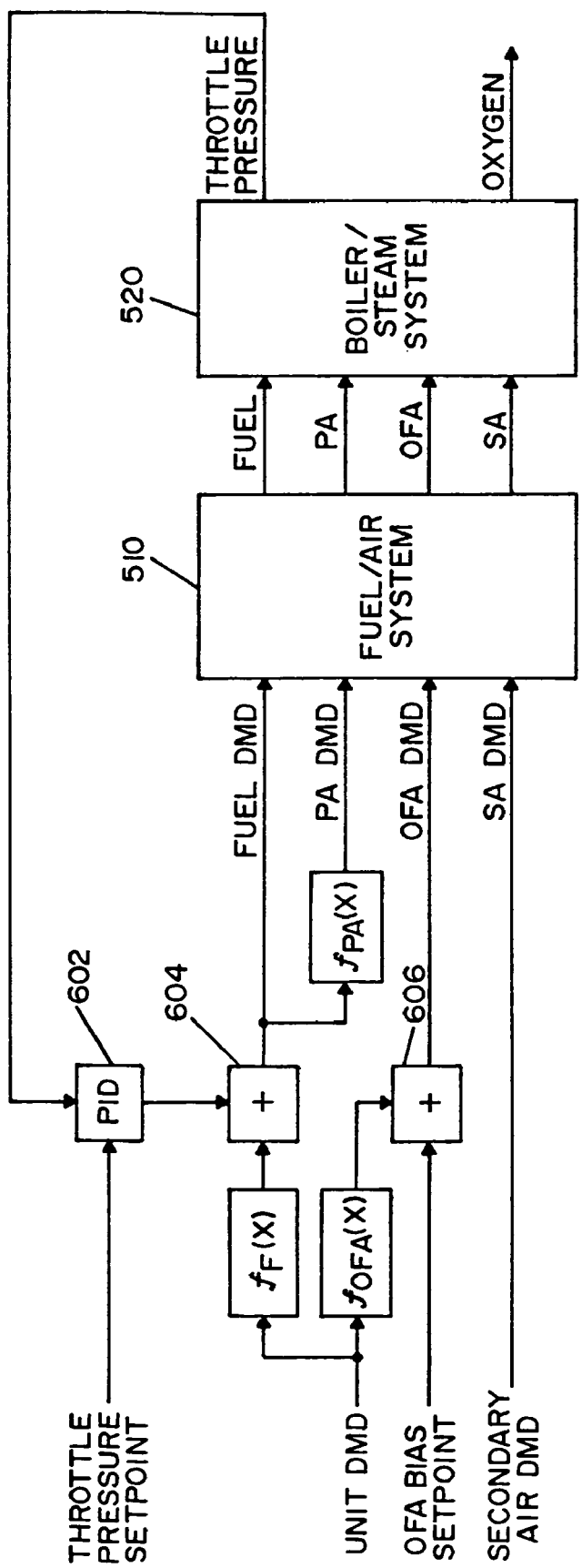
FIG. 3 illustrates the use of manual control of secondary air in the typical control system for fuel and air in a boiler.

Alternatively, the operator may choose to turn off oxygen PID control loop 610 and manually control the secondary air demand setpoint, as illustrated by the control scheme shown in FIG. 3. In this case, the operator uses the second air demand (SA DMD) to manually control the oxygen and prevent flame extinction. The operator uses a variety of different sensor readings, including potentially the oxygen level, secondary air flow, primary air flow, overfire air damper positions, fuel flow, forced draft fan amps, and flame scanner relative numbers. Using these multiple sources of information, the operator can recognize conditions caused by low heat content of the fuel or drifting oxygen sensors and respond by increasing the secondary air and subsequently the oxygen levels in the flue gas. However, it is difficult for the operator to maintain manual control on the secondary air at all times, and it is often easier to simply increase the oxygen setpoint in the control scheme of FIG. 2 than to maintain manual control of the secondary air as shown by the control scheme of FIG. 3. Moreover, the control scheme of FIG. 3 cannot be used in conjunction with a combustion optimization system since a critical variable, oxygen, is not under automatic control. The control scheme of FIG. 2 is also not appropriate for use with a combustion optimization system because the lower limit on the oxygen setpoint is maintained at an artificially high level under most operating conditions. The deficiencies in the control schemes of FIGS. 2 and 3 are overcome by the present invention by providing an improved oxygen control system that is based upon optimization.

Optimization System

Figure 4:
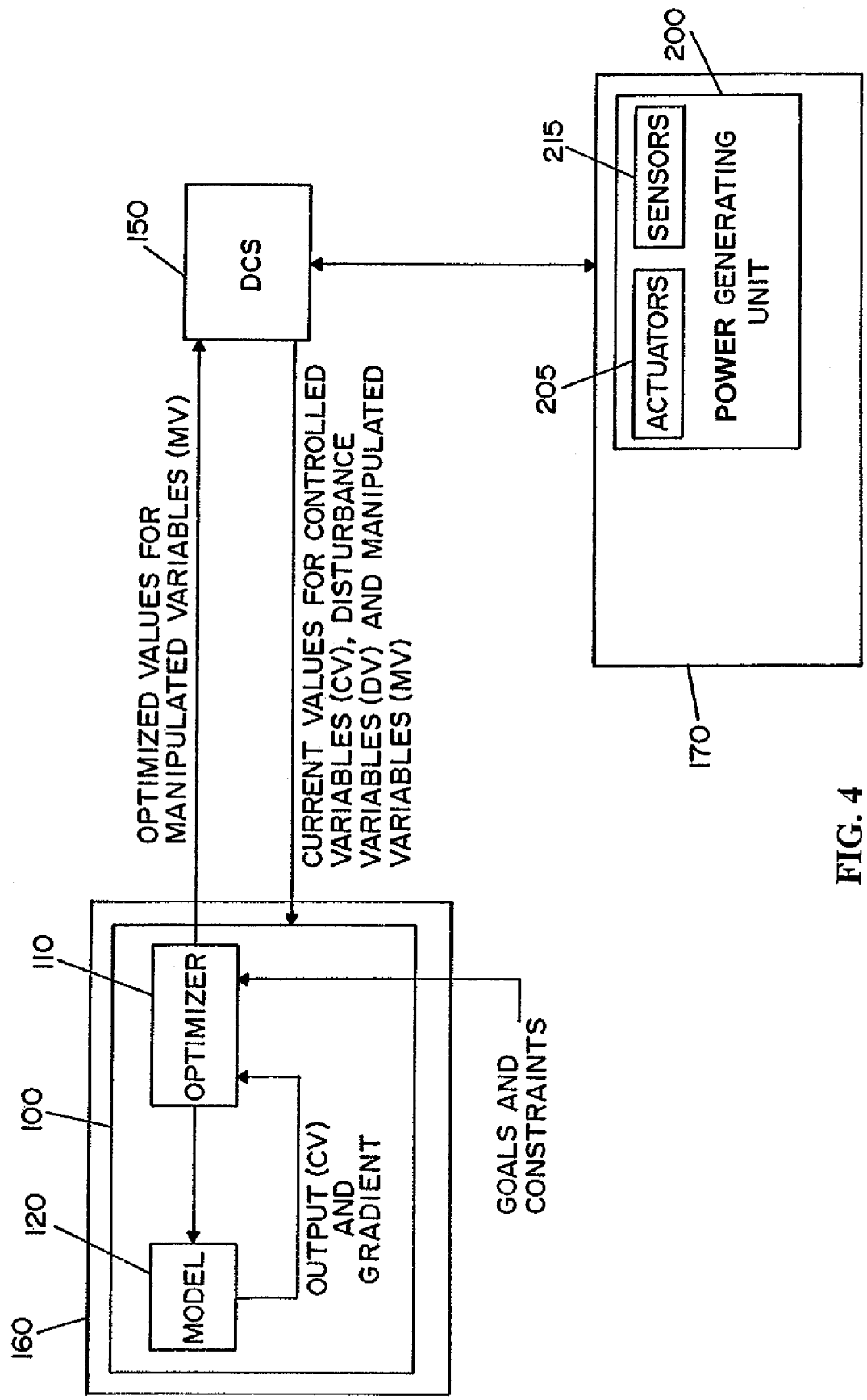
FIG. 4 illustrates an optimization system connected with a distributed control system (DCS) for controlling operation of a power generating plant.

FIG. 4 illustrates a block diagram of an optimization system 100. In the illustrated embodiment, optimization system 100 is comprised of an optimizer 110 and a model 120.

Optimizer 110 and model 120 are both described in greater detail below. In accordance with an illustrated embodiment, optimization system 100 may form part of a supervisory controller 160 that communicates with a distributed control system (DCS) 150. DCS 150 is a computer-based control system that provides regulatory control of a power generating plant 170. DCS 150 may take the form of a programmable logic controller (PLC). Supervisory controller 160 is a computer system that provides supervisory control data to DCS 150. It should be understood that in an alternative embodiment, model 120 may reside on a different computer system than optimizer 110.

An operator interface (not shown) provides means for an operator to communicate with DCS 150. DCS 150 may also communicate with a historian (not shown).

Plant 170 includes one or more power generating units 200. Each power generating unit 200 includes a plurality of actuators 205 and sensors 215. Actuators 205 includes devices for actuating components such as valves and dampers. Sensors 215 include devices for sensing various system parameters (e.g., temperature, pressure, flow rate, and flue gas components).

Model 120 is used to represent the relationship between (a) manipulated variables (MV) and disturbance variables (DV) and (b) controlled variables (CV). Manipulated variables (MVs) may be changed by the operator or optimization system 100 to affect the controlled variables (CVs). As used herein, disturbance variables refer to variables (associated with power-generating unit 200) that affect the controlled variables, but cannot be manipulated by an operator (e.g., ambient conditions, characteristics of the fuel, characteristics of a fuel blend, characteristics of fuel additives, etc.). Optimizer 110 determines an optimal set of setpoint values for the manipulated variables given (1) desired goal(s) associated with operation of the power generating unit (e.g., minimizing NOx production) and (2) constraints associated with operation of the power generating unit (e.g., limits on emissions of NOx, $SO_2$, $CO_2$, CO, mercury, ammonia slip and particulate matter).

At a predetermined frequency (e.g., every 10-30 seconds), optimization system 100 obtains the current values of manipulated variables, controlled variables and disturbance variables from DCS 150. An "optimization cycle" commences each time the current values for the manipulated variables, controlled variables and disturbance variables are read out from DCS 150.

As will be described in further detail below, optimization system 100 uses model 120 to determine an optimal set of setpoint values for the manipulated variables based upon current conditions of power generating unit 200. The optimal set of setpoint values are sent to DCS 150. An operator of plant 170 has the option of using the optimal set of setpoint values for the manipulated variables. In most cases, the operator allows the computed optimal set of setpoint values for the manipulated variables to be used as setpoints values for control loops. Optimization system 100 runs in a closed loop adjusting the setpoints values of the manipulated variables at a predetermined frequency (e.g., every 10-30 seconds or more frequently) depending upon current operating conditions of power generating unit 200.

Neural Network based Dynamic Model

It should be understood that while the present invention is described herein with reference to models in the form of neural network based models, it is contemplated that the present invention may be implemented using other types of models, including but not limited to, an empirically developed model, a model based upon heuristics, a support vector machine (SVM) model, a model developed by linear regression, or a model developed using "first principles" knowledge. A model that is developed using known physical equations is referred to as a model developed using "first principles" knowledge.

To properly capture the relationship between the manipulated/disturbance variables and the controlled variables, model 120 may have the following characteristics:

Nonlinearity: A nonlinear model is capable of representing a curve rather than a straight line relationship between manipulated/disturbance and controlled variables. For example, a nonlinear, curved relationship is often observed between overfire air (OFA) dampers and NOx.

Multiple Input Multiple Output (MIMO): The model must be capable of capturing the relationships between multiple inputs (manipulated/disturbance variables) and multiple outputs (controlled variables).

Dynamic: Changes in the inputs do not instantaneously affect the outputs. Rather there is a time delay and follow by a dynamic response to the changes. It may take 15-30 minutes for changes in the inputs to fully propagate through the system. Since optimization systems execute at a predetermined frequency (e.g., an optimization cycle commencing every 10-30 seconds), the model must represent the effects of these changes over time and take them into account.

Adaptive: The model must be updated at the beginning of each optimization cycle (e.g., every 10-30 seconds) to reflect the current operating conditions of the boiler.

Derived from Empirical Data: Since each boiler is unique, the model must be derived from empirical data obtained from the power generating unit.

Given the foregoing requirements, a neural network based approach is presently the preferred technology for implementing models in accordance with the present invention. Neural networks are developed based upon empirical data using advanced regression algorithms. See, for example, C. Bishop, *Neural Networks for Pattern Recognition*, Clarendon Press, Oxford, U.K., 1995, fully incorporated herein by reference. Neural networks are capable of capturing the nonlinearity commonly exhibited by boilers. Neural networks can also be used to represent systems with multiple inputs and outputs. In addition, neural networks can be updated using either feedback biasing or on-line adaptive learning.

Dynamic models can also be implemented in a neural network based structure. A variety of different types of model architectures have been used for implementation of dynamic neural networks, as described in S. Piche, "Steepest Descent Algorithms for Neural Network Controllers and Filters," *IEEE Trans. Neural Networks*, vol. 5, no. 2, pp. 198-212, 1994 and A. Barto, "Connectionist Learning for Control," Neural Networks for Control, edited by Miller, W., Sutton, R. and Werbos, P., MIT Press, pp 5-58, 1990, both of which are fully incorporated herein by reference. Many of the neural network model architectures require a large amount of data to successfully train the dynamic neural network. A novel neural network structure, which may be trained using a relatively small amount of data, was developed in the late 1990's. Complete details on this dynamic neural network based structure are provided in S. Piche, B. Sayyar-Rodsari, D. Johnson and M. Gerules, "Nonlinear model predictive control using neural networks," *IEEE Control Systems Magazine*, vol. 20, no. 2, pp. 53-62, 2000, which is fully incorporated herein by reference.

Given a model of a boiler, it is possible to compute the effects of changes in the manipulated variables on the controlled variables. Furthermore, since the model is dynamic, it is possible to compute the effects of changes in the manipulated variables over a future time horizon (i.e., multiple changes rather than a single change).

Given that a relationship between inputs and outputs is well represented by the model described above, it will now be described how setpoint values for inputs (i.e., manipulated variables) can be determined to achieve desired goals while also observing the constraints.

Optimizer

An optimizer is used to minimize a "cost function" subject to a set of constraints. The cost function is a mathematical representation of a desired goal or goals. For instance, to minimize NOx, the cost function includes a term that decreases as the level of NOx decreases. One common method for minimizing a cost function is known as "gradient descent optimization." Gradient descent is an optimization algorithm that approaches a local minimum of a function by taking steps proportional to the negative of the gradient (or the approximate gradient) of the function at the current point.

Since the model is dynamic, the effects of changes must be taken into account over a future time horizon. Therefore, the cost function includes terms over a future horizon, typically one hour for "combustion" optimization. Since the model is used to predict over a time horizon, this approach is commonly referred to as model predictive control (MPC). Model Predictive Control is described in detail in S. Piche, B. Sayyar-Rodsari, D. Johnson and M. Gerules, "Nonlinear model predictive control using neural networks," *IEEE Control Systems Magazine*, vol. 20, no. 2, pp. 53-62, 2000, which is fully incorporated herein by reference.

Constraints may be placed upon both the inputs (Mvs) and outputs (CVs) of the boiler over the future time horizon. Typically, constraints that are consistent with limits associated with the DCS are placed upon the manipulated variables. Constraints on the outputs (CVs) are determined by the problem that is being solved.

A nonlinear model can be used to determine the relationship between the inputs and outputs of a boiler. Accordingly, a nonlinear programming optimizer is used to solve the optimization problem in accordance with this embodiment of the present invention. However, it should be understood that a number of different optimization techniques may be used depending on the form of the model and the costs and constraints. For example, it is contemplated that the present invention may be implemented by using, individually or in combination, a variety of different types of optimization approaches. These optimization approaches include, but not limited to, linear programming, quadratic programming, mixed integer non-linear programming (NLP), stochastic programming, global non-linear programming, genetic algorithms, and particle/swarm techniques.

Given the cost function and constraints, a non-linear program (ALP) optimizer typically solves problems with 20 manipulated variables and 10 controlled variables in less than one second. This is sufficiently fast for most applications since the optimization cycle is typically in the range of 10-30 seconds. More details on the formulation of the cost function and constraints are provided in the above mentioned reference S. Piche, B. Sayyar-Rodsari, D. Johnson and M. Gerules, "Nonlinear model predictive control using neural networks," *IEEE Control Systems Magazine*, vol. 20, no. 2, pp. 53-62, 2000, which is fully incorporated herein by reference.

The optimizer computes the full trajectory of manipulated variable moves over the future time horizon, typically one hour. For an optimization system that executes every 30 seconds, 120 values are computed over a one hour future time horizon for each manipulated variable. Since the model or goals/constraints may change before the next optimization cycle, only the first value in the time horizon for each manipulated variable is output by the optimization system to the DCS as a setpoint value for each respective manipulated variable.

At the next optimization cycle, typically 30 seconds later, the model is updated based upon the current conditions of the boiler. The cost function and constraints are also updated if they have changed. Typically, the cost function and constraints are not changed. The optimizer is used to recompute the set of values for the manipulated variables over the time horizon and the first value in the time horizon, for each manipulated variable, is output to the DCS as the setpoint value for each respective manipulated variable. The optimization system repeats this process for each optimization cycle (e.g., every 30 second), thus, constantly maintaining optimal performance as the boiler is affected by changes in such items as load, ambient conditions, boiler conditions, and fuel characteristics.

Combustion Optimization System

An oxygen optimization system according to the present invention is used to overcome the problems described in connection with the control schemes of FIGS. 2 and 3. The oxygen optimization system will be described in detail below. However, a combustion optimization system will first be described in order to support the importance of the oxygen optimization system.

Figure 5:
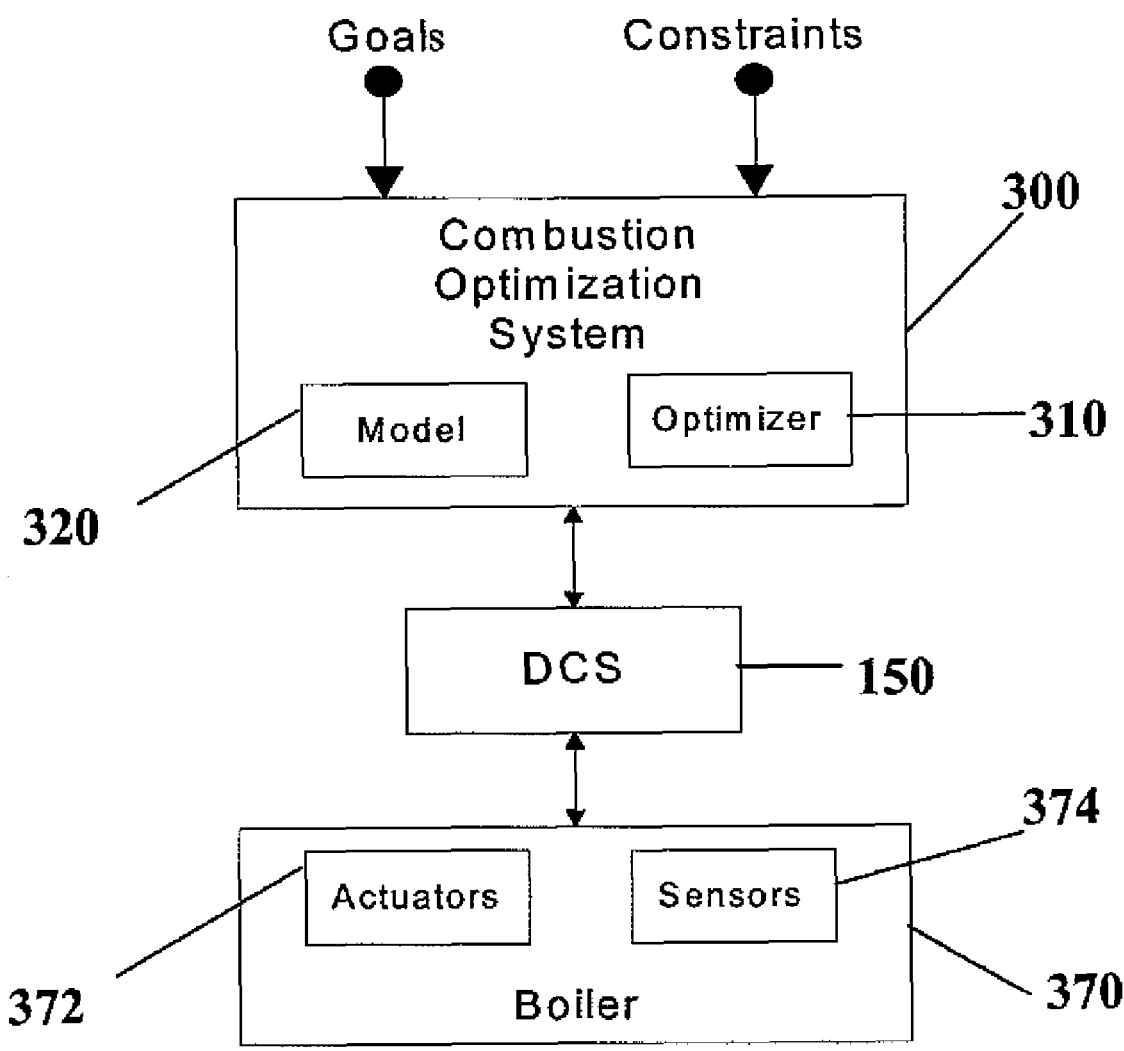
FIG. 5 illustrates a combustion optimization system.

FIG. 5 shows a combustion optimization system 300. Combustion optimization system 300 communicates with a distributed control system (DCS) 150 to control a boiler to achieve the desired combustion characteristics, based upon constraints and goals specified by an operator or an engineer. Combustion optimization system 300 includes a boiler model 320 and an optimizer 310. Boiler 370 includes the components discussed above, as well as actuators 372 and sensors 374. DCS 150 communicates current values of the manipulated, disturbance, and controlled variables to combustion optimization system 300.

Figure 6:
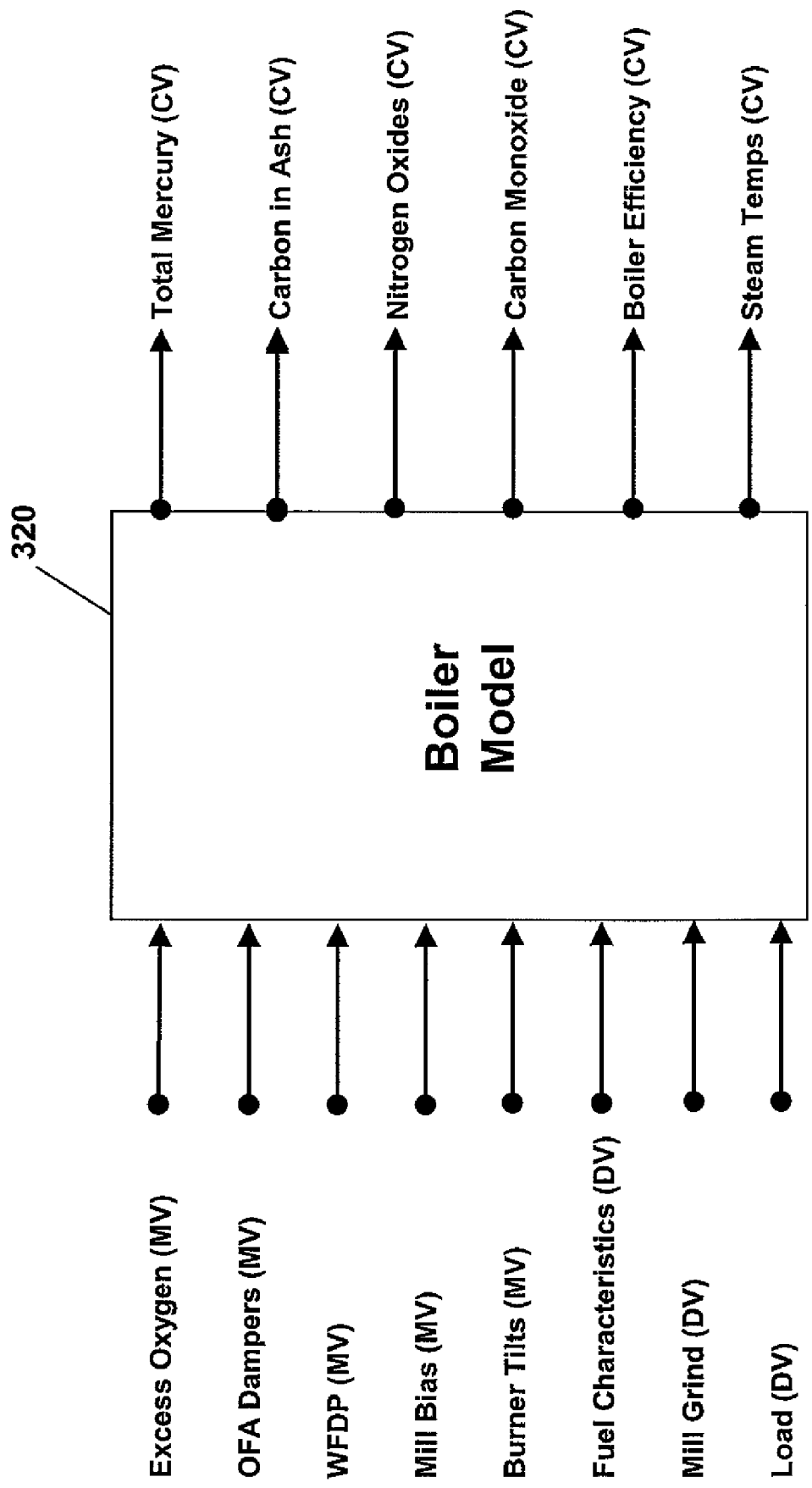
FIG. 6 illustrates an embodiment of a boiler model used in the combustion optimization system shown in FIG. 5.

Combustion optimization system 300 uses model 320, optimizer 310, goals and constraints as described above. FIG. 6 shows an embodiment of model 320 used in combustion optimization system 300.

By way of example, and not limitation, the manipulated variable (MV) inputs to model 320 may include the following: level of excess oxygen in the flue gas, the overfire air (OFA) damper positions, the windbox-to-furnace differential pressure (WFDP), biases to each of the mills, and the burner tilt angles. The disturbance variable (DV) inputs to model 320 may typically include the following: fuel characteristics, fineness of the mill grind, and load demand. The above-identified manipulated variables and disturbance variables for illustrated model 320 will now be briefly described.

"Excess oxygen" refers to the percentage amount of excess oxygen introduced into the furnace above that required for full combustion of the fuel. As the amount of excess oxygen increases, the boiler operates in an air rich environment.

With respect to "overfire air (OFA) damper positions," overfire air is introduced above the combustion zone in a furnace in order to reduce CO emissions and lower NOx emissions. The amount of overfire air is controlled by the position of a damper.

The "windbox to furnace differential pressure (WFDP)" controls the velocity of secondary air entry into the boiler which affects the location of the combustion within the furnace.

With respect to "mill bias," mills are used to grind the coal before the primary air transports the coal dust into the furnace through the burner. The amount of coal ground by each mill is determined primarily by load. However, it is possible to bias the amount of coal such that more or less coal is introduced at various levels. This can be used to incrementally affect the staging of combustion.

As to "coal characteristic," the chemical composition of coal changes even if it is extracted from the same mine. Changes in nitrogen, sulfur, mercury and BTU content are common.

With respect to "mill grind," as described above, mills are used to grind the coal into a fine dust that can be injected into a furnace. The fineness of the grind changes over time as the mill wears.

The term "load" refers to the required electrical power generation rate for a power generating unit.

Model 320 is used to predict the effects of changes in the manipulated and disturbance variables on the outputs of the boiler. FIG. 6 illustrates one embodiment of the potential set of controlled variable (CV) outputs of model 320. In this embodiment, model 320 is used to predict emissions from the power generating unit (i.e., mercury, nitrogen oxides, and carbon monoxide), the amount of carbon in the ash (CIA), boiler efficiency, and steam temperatures (i.e., main, superheat and reheat temperatures).

Optimizer 310 uses model 320 of FIG. 6, along with the goals and constraints, in order to determine optimal combustion. The goals are expressed in the form of a cost function. In one embodiment, the cost function may be used to minimize the amount of emissions (such as NOx and mercury), while observing constraints on variables such as CO, CIA or both CO and CIA. In addition, the cost function may also be used to make trade-offs between boiler efficiency and emissions. Also, the cost function may be used to maintain steam temperatures at desired set-points. Finally, boiler and environmental consideration may place additional constraints upon the manipulated variables, such as a lower limit on the allowed excess oxygen. Using the foregoing approach, combustion optimization system 300 can be used to determine the optimal setpoint values of manipulated variables, based upon current operating conditions and the desires of operators and engineers.

In addition to the embodiment described above, U.S. patent application Ser. No. 10/985,705 (filed Nov. 10, 2004), entitled "System for Optimizing a Combustion Heating Process" (fully incorporated herein by reference) discloses a combustion optimization approach to modeling controllable losses in a power generating unit, and a method for optimizing the combustion process based upon these controllable losses. Also, optimization of sootblowing can be included in a combustion optimization as described in the U.S. patent application Ser. No. 11/053,734 (filed Feb. 8, 2005), entitled "Method and Apparatus for Optimizing Operation of a Power Generation Plant Using Artificial Intelligence Techniques" (fully incorporated herein by reference). Furthermore, U.S. patent application Ser. No. 11/301,034 (filed Dec. 12, 2005), entitled "Model Based Control and Estimation of Mercury Emissions" (fully incorporated herein by reference) discloses a combustion optimization system and a method for reducing mercury emissions from a coal-fired power plant, while observing limits on the amount of carbon in the fly ash produced by the combustion process.

Oxygen Optimization System

Figure 7:
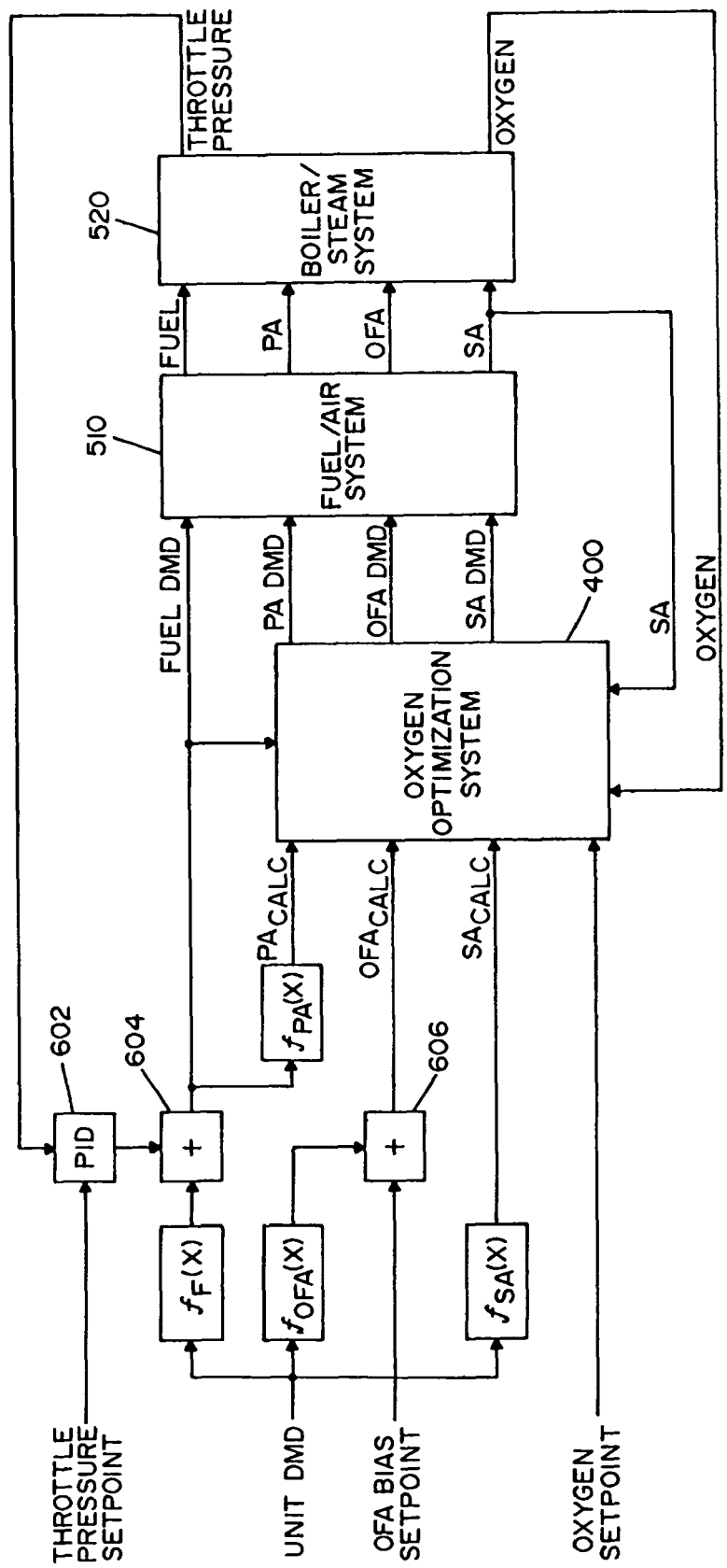
FIG. 7 shows a control system for fuel and air in a boiler, wherein the control system includes an oxygen optimization system according to an embodiment of the present invention.

Referring now to FIG. 7, there is shown a control scheme according to an embodiment of the present invention that includes an oxygen optimization system 400. The control scheme of FIG. 7 is a modification of the control scheme of FIG. 2. In this respect, oxygen PID control loop 610 of FIG. 2 has been replaced by oxygen optimization system 400. Fuel demand (Fuel DMD) is controlled by throttle pressure PID control loop 602 in the same manner as described above in connection with the control scheme of FIG. 2. However, unlike the control scheme of FIG. 2, oxygen optimization system 400 is used to determine primary air demand (PA DMD), overfire air demand (OFA DMD), and secondary air demand (SA DMD). PA DMD, OFA DMD, and SA DMD are manipulated variables (Mvs) of oxygen optimization system 400.

Oxygen optimization system 400 is used to control secondary air flow (i.e., "secondary air") and oxygen, which are controlled variables (CVs). The unit demand (Unit DMD) and fuel demand (Fuel DMD) are disturbance variables (DVs) in oxygen optimization system 400. Unit demand (Unit DMD) may be directly input into oxygen optimization system 400, or alternatively, calculations associated with function calculation blocks for primary air ($PA_{calc}$), overfire air ($OFA_{calc}$), and secondary air ($SA_{calc}$) may be input to oxygen optimization system, as shown in FIG. 7. Furthermore, the desired setpoint value for oxygen is input to oxygen optimization system 400.

Figure 8:
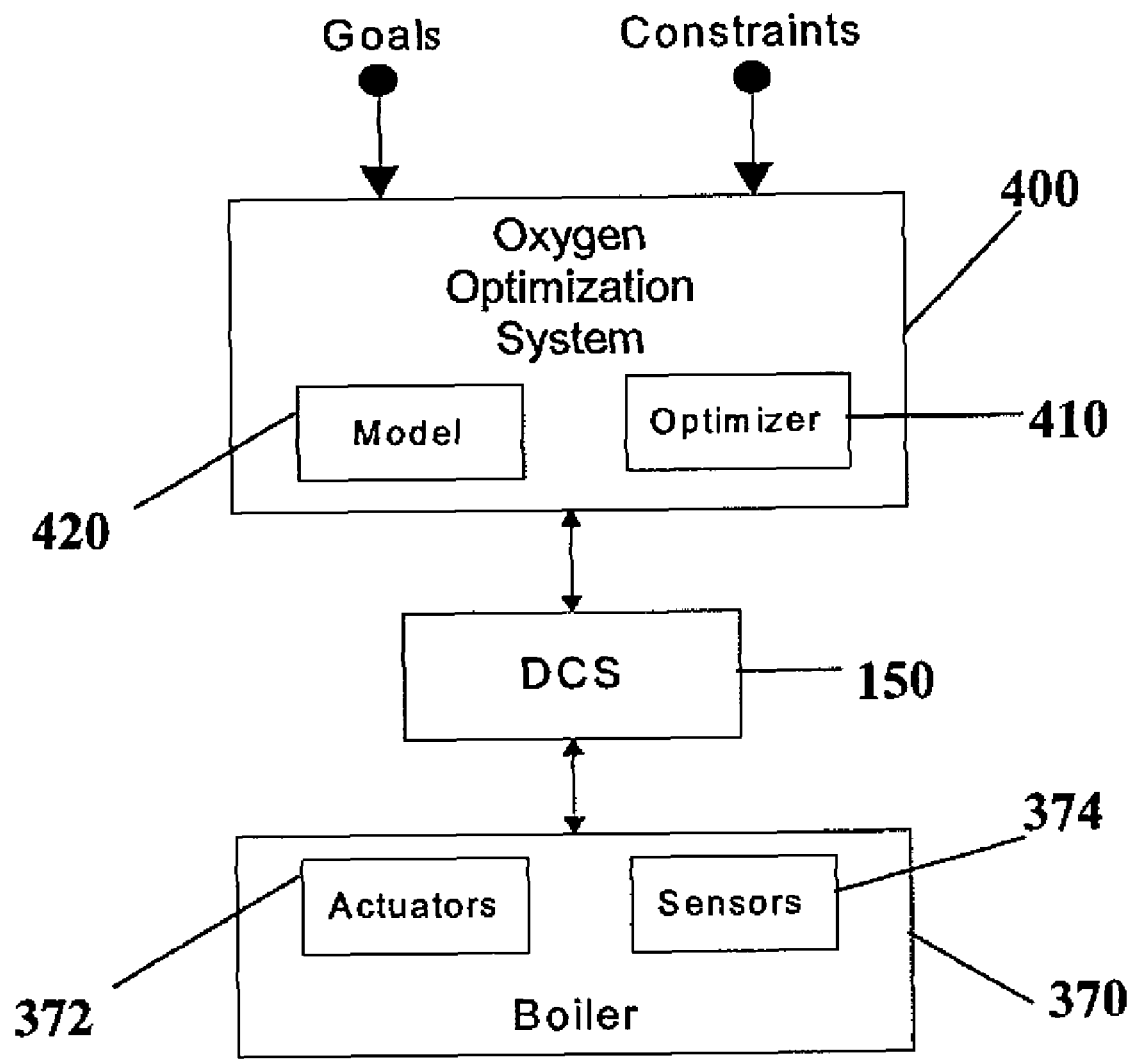
FIG. 8 illustrates an oxygen optimization system according to an embodiment of the present invention.

FIG. 8 shows a detailed view of oxygen optimization system 400. Oxygen optimization system 400 communicates with a DCS 150 to control air flow to the boiler to achieve the desired combustion characteristics, based upon specified goals and constraints. Oxygen optimization system 400 includes a model 420 and an optimizer 410. As indicated above in connection with FIG. 5, boiler 370 includes actuators 372 and sensors 374, as well as the components discussed in detail above. DCS 150 communicates current values of manipulated variables (MVs), disturbance variable (DVs), and controlled variables (CVs) to oxygen optimization system 400.

Figure 9:
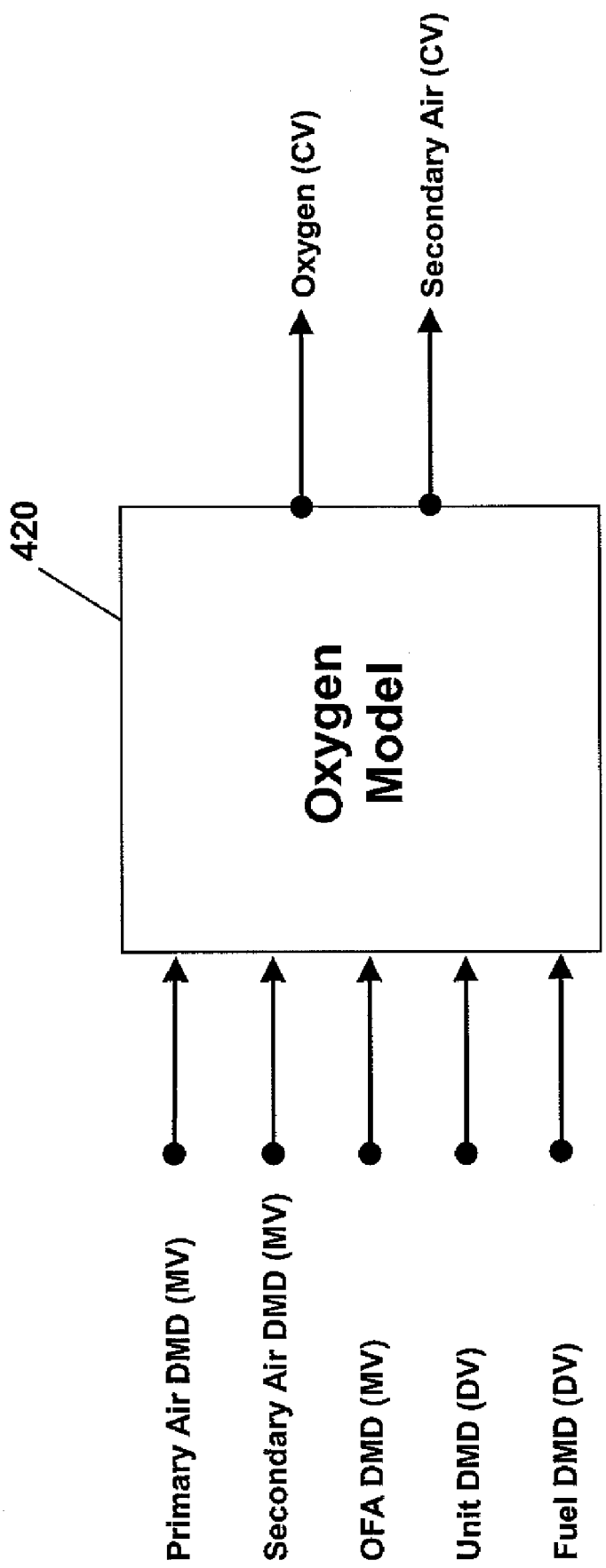
FIG. 9 illustrates an embodiment of an oxygen model used in the oxygen optimization system shown in FIG. 8.

Oxygen optimization system 400 uses model 420, optimizer 410, as well as goals and constraints, as described above. FIG. 9 illustrates an embodiment of model 420. Model 420 is used to predict the effects of changes in manipulated variables (MVs) and disturbance variables (DVs) on the controlled variable (CV) outputs associated with fuel/air system 510 and boiler/steam system 520. In the illustrated embodiment, an output of fuel/air system 510 is the secondary air flow (i.e., "secondary air"), and an output of the boiler/steam system 520 is oxygen in the boiler. Accordingly, secondary air and oxygen are predicted controlled variable (CV) outputs of model 420. It should be appreciated that the controlled variables (CV) shown in FIG. 9 are exemplary, and are not intended to limit the scope of the present invention.

By way of example, and not limitation, the manipulated variable (MV) inputs to model 420 may include one or more of the following: primary air demand (PA DMD), secondary air demand (SA DMD), and overfire air demand (OFA DMD). The disturbance variable (DV) inputs to model 420 may typically include one or more of the following: unit load demand (Unit DMD) or alternatively, associated function calculation block values of the unit load demand (i.e., $PA_{calc}$, $OFA_{calc}$, and $SA_{calc}$), and fuel demand (Fuel DMD).

It should be understood that the manipulated variables, disturbance variables and controlled variables described in connection with oxygen optimization system 400 are exemplary only, and that other manipulated variables, disturbance variables and controlled variables may be used in connection with the present invention.

Optimizer 410 uses model 420 of FIG. 9, along with the goals and constraints (e.g., limits on secondary air, limit on oxygen, limit on emissions of CO, and limit on emissions of NOx), in order to determine optimal air flow to the boiler. The goals are expressed in a mathematical form as a cost function. Optimizer 410 is used to minimize (or maximize) the cost function subject to the constraints. The constraints associated with the cost function may include both hard constraints (i.e., constraints that must be necessarily satisfied) and soft constraints (i.e., constraints that express a preference for some solutions over other solutions). Violations of hard constraints may have a relatively high penalty, whereas violations of soft constraints can have varying "regions of penalties." One common method for minimizing a cost function is known as "gradient descent optimization." Gradient descent is an optimization algorithm that approaches a local minimum of a function by taking steps proportional to the negative of the gradient (or the approximate gradient) of the function at the current point.

In one embodiment of the present invention, upper and lower soft constraints implemented in the cost function may be placed upon the oxygen, a controlled variable (CV). In addition, a desired setpoint value for the oxygen may be placed at or below the lower soft constraint. Finally, upper and lower soft constraints of greater priority are placed upon the secondary air flow, a controlled variable (CV).

For example, at fill load, an upper soft constraint may be placed on the oxygen at 5% (i.e., an oxygen concentration of 5% in the flue gas) while a lower soft constraint may be place at 3%. A weighting factor of 10 may be placed upon these soft constraints. A desired setpoint value of 2.5% may be place on the oxygen with a weighting factor of 1. Since the soft constraints have a higher weighting factor than the desired setpoint value, optimizer 410 will try to move oxygen towards 2.5% but will not move it much below 3%, due to the significant penalty caused by the higher weighting factor of the soft constraints.

An upper soft constraint may be placed on secondary air at 90% (i.e., a flow rate or velocity of secondary air that is 90% of a maximum flow rate or velocity) while a lower soft constraint may be placed on secondary air at 80%. A weighting factor of 100 may be placed on these soft constraints. Because a larger weighting factor is used on the soft constraints on secondary air than on the soft constraints on oxygen, the soft constraints on secondary air will override the soft constraints on oxygen.

Using this approach, the lower soft constraint and desired setpoint value of oxygen are set based upon operational and environment concerns rather than flame stability concerns. Under normal conditions, oxygen optimization system 400 will facilitate operation at the lower soft constraint of oxygen, near the desired setpoint value of oxygen. However, if the heat content of the fuel decreases, more primary air is needed, thereby decreasing the flow of secondary air. If the secondary air hits its lower soft constraint, the oxygen optimization system 400 can shift air from the overfire air system to the secondary air system. If there is not sufficient air available in the overfire air system, the oxygen optimization system 400 will automatically allow the oxygen to increase due to the higher priority soft constraint upon secondary air. If allowed, optimization system 400 may also reduce primary air demand in this situation. The amount of allowable reduction in primary air demand is bounded by hard constraints. Typically, the amount of allowable reduction in primary air demand is small due to the need to provide sufficient air to convey fuel to the burners. Using the foregoing approach, the oxygen level is minimized while guaranteeing that the needed secondary air and flame stability are maintained in the boiler.

The lower soft constraint upon the secondary air also counteracts the effects of an artificially high oxygen reading. As described above, an artificial high reading of oxygen causes the secondary air to decrease in order to maintain the desired level of oxygen. However, as the secondary air decreases, it will become constrained in oxygen optimization system 400. As a result, the negative effect of an inaccurate oxygen measurement is counteracted.

Similarly, the upper soft constraint upon secondary air is used to counteract the effects of an artificially low reading of oxygen. In this case, the artificially low reading of oxygen causes the secondary air to increase. By constraining the secondary air in oxygen optimization system 400, the effects of an artificial low reading of oxygen can be minimized.

It should be understood that constraints on secondary air and oxygen may change as a factor of load demand.

Multi-Oxygen Optimization System

In the embodiment described above, oxygen optimization system 400 is used to control a single oxygen level associated with the boiler/steam system 520. The measured oxygen level associated with the boiler/steam system 520 may be obtained from a single oxygen sensor or from multiple oxygen sensors located in different regions of the boiler/steam system 520. In the case of multiple oxygen sensors, oxygen level readings are obtained from each of the oxygen sensors and combined into a single measured oxygen value. For example, readings from each of the oxygen sensors may be averaged to determined a single measured oxygen level. The single measured oxygen level is input to oxygen optimization system 400.

According to an alternative embodiment of the present invention, oxygen optimization system 400 is used to control a plurality of oxygen levels respectively associated with a plurality of oxygen sensors (i.e., a grid of oxygen sensors). Each of the oxygen sensors may be located in a different region of the boiler/steam system 520.

In the control scheme of FIG. 2, it is necessary to combine the measurements from the control system into a single oxygen value that is used in PID control loop 610. Since oxygen optimization system 400 of FIG. 7 is capable of controlling multiple outputs, it is not necessary to combine multiple oxygen level readings into a single measured oxygen value. Instead, the oxygen levels respectively associated with the grid of oxygen sensors may be individually controlled or optionally controlled in a grouped manner. In this regard, the manipulated variables (MVs) and disturbance variables (DVs) input to oxygen model 420 are the same as those described in the previous embodiment. However, the controlled variables (CVs) output by oxygen model 420 are secondary air and a plurality of oxygen levels respectively associated with the grid of oxygen sensors (i.e., oxygen$_1$, oxygen$_2$, oxygen$_3$, etc). The previously described soft constraints and desired setpoint values are used on the controlled variables (CVs), i.e., the secondary air and the plurality of oxygen levels. The resulting optimization scheme attempts to reduce each measured oxygen level (associated with the grid of oxygen sensors) to the minimum soft constraint of the oxygen CVs. Once again, changes in heat content are handled by shifting overfire air or alternatively allowing the oxygen to increase to prevent secondary air falling below the soft constraint of the secondary air CV.

The upper soft constraint on oxygen is used to counteract the effects of large disparities among the plurality of oxygen sensor readings. For example, in a system with two oxygen sensors, if the first oxygen sensor measures 5.5% and the second oxygen sensor measures 3%, without an upper soft constraint on oxygen, optimization system 400 would not adjust oxygen. However, with an upper soft constraint on oxygen of 5%, optimization system 400 will lower the overall oxygen, such that the first oxygen sensor measures 2.75% while the second oxygen sensor measures 5.25%. By using an upper soft constraint on oxygen, large disparities in oxygen sensor readings can be addressed using oxygen optimization system 400 of FIG. 7.

It should be appreciated that an optimization system may also be used in the manner described above to control other parameters of the power generating unit (e.g., NOx emissions, CO emissions, $CO_2$ emissions, mercury emissions, ammonia, $H_2O$, or temperature). In this regard, a plurality of sensing devices for sensing a parameter of the power generating unit (e.g., NOx sensors, CO sensors, $CO_2$ sensors, mercury sensors, ammonia sensors, $H_2O$ sensors, or temperature sensors) are spatially located in different regions of the power generating unit in a manner similar to the oxygen sensors described above. Accordingly, an optimization system can be used to control a plurality of parameter levels at different regions of the power generating unit. The parameters are associated with controlled variables of the power generating unit.

Combined Combustion Optimization and Oxygen Optimization Systems

The previously described combustion optimization system 300 and oxygen optimization system 400 may be combined to optimize operation of a boiler. In this respect, the two optimization systems 300, 400 operate in a master-slave configuration, wherein combustion optimization system 300 serves as the master and oxygen optimization system 400 serves as the slave.

In one embodiment, combustion optimization system 300 is used to determine optimal setpoint values for manipulated variables (MVs) including "excess oxygen." The optimal setpoint value for excess oxygen is then used for the desired setpoint value for oxygen in oxygen optimization system 400. The manipulated variable (MV) constraints on excess oxygen in combustion optimizer 310 and the controlled variable (CV) soft constraints on oxygen in oxygen optimizer 410 are set equal to each other to provide consistency between the optimization systems 300 and 400.

Using the foregoing approach, NOx emissions can be minimized, boiler efficiency can maximized, and flame stability can be automatically maintained even in the presence of large variations in heat content of the fuel or in the case of large drift in sensor readings of oxygen in the boiler.

In another embodiment, an "oxygen profile" obtained from multiple, spatially separated oxygen sensors in a boiler and the overall average oxygen are controlled using a combustion optimization system. The overall average oxygen may be controlled by a DCS PID control loop that adjusts the total air flow to the boiler as shown in FIG. 2, or as part of a combined combustion optimization and oxygen optimization system. The oxygen profile is controlled by determining the deviation of each individual oxygen sensor from the overall average oxygen value determined from a grid of oxygen sensors. These individual deviations are then used as controlled variables (CVs) in the combustion optimization system. In this embodiment, the manipulated variables (MVs) are the secondary air and overfire air dampers (i.e., SA DMD and OFA DMD), which are used to shift the distribution of air in the boiler to influence individual oxygen sensors in the grid. Controlling the oxygen profile allows the combustion optimization system to better address individual operating regions within the boiler.

Other modifications and alterations will occur to others upon their reading and understanding of the specification. It is intended that all such modifications and alterations be included insofar as they come within the scope of the invention as claimed or the equivalents thereof.

Having described the invention, the following is claimed:

1. A control system for controlling oxygen in flue gas produced by a boiler for a fossil fuel fired power generating unit, said control system comprising:
   means for receiving data signals from a plurality of sensors for sensing parameters associated with operation of the power generating unit;
   a model for predicting oxygen in the flue gas produced by the boiler, the model comprising:
      a plurality of inputs for receiving input values associated with manipulated variables and disturbance variables associated with the power generating unit, and
      one or more outputs for providing output values associated with controlled variables, at least one output providing a first output value indicative of predicted oxygen in the flue gas in accordance with the input values;
   an optimizer for determining optimal setpoint values for each of the manipulated variables by accessing said model to minimize a cost value of a cost function while observing at least one constraint associated with operation of the power generating unit, said cost value affected by the value for each said manipulated variable, wherein said optimizer determines the optimal setpoint values in accordance with at least one goal and the at least one constraint, said optimal setpoint values producing optimal air flow into the boiler; and
   means for controlling operation of the power generating unit using the optimal setpoint values for the manipulated variables.

2. A control system according to claim 1, wherein said model is selected from the group consisting of the following: a neural network model, an empirically developed model, a model developed using "first principles," a support vector machine (SVM) model, a model developed by linear regression and a model based upon heuristics.

3. A control system according to claim 1, wherein said optimizer is selected from the group consisting of:
   linear programming, quadratic programming, mixed integer non-linear programming (NLP), stochastic programming, global non-linear programming, genetic algorithms, and particle/swarm techniques.

4. A control system according to claim 1, wherein said cost value is affected by the value of each said manipulated variable over a plurality of time intervals, said optimizer determining a respective value for each said manipulated variable for the plurality of time intervals in accordance with minimization of said cost value.

5. A control system according to claim 4, wherein the respective value of each said manipulated variable for a first time interval of the plurality of time intervals is determined as said respective optimal value for an optimization cycle.

6. A control system according to claim 4, wherein said optimizer determines said respective value for each said manipulated variable for said plurality of time intervals while observing said at least one constraint across said plurality of time intervals.

7. A control system according to claim 1, wherein said cost function and said at least one constraint are determined to prevent flame extinction and flame instability in the boiler of the power generating unit.

8. A control system according to claim 1, wherein said cost function and said at least one constraint are determined to counteract the effects of variations in the fossil fuel.

9. A control system according to claim 1, wherein said cost function and said at least one constraint are determined to counteract effects of drift in data signals indicative of oxygen concentration generated by oxygen sensors.

10. A system according to claim 1, wherein said at least one constraint includes at least one of the following: a limit on secondary air, a limit on oxygen, a limit on emissions of CO, and a limit on emissions of NOx.

11. A control system according to claim 1, wherein
said manipulated variables include at least one of the following: primary air demand, secondary air demand, overfire air demand, forced air fan, primary air fan, forced air fan, induced air fan, exhauster fan, and mill bias;
said disturbance variables include at least one of the following: fuel demand, unit demand, characteristics of fuel blend, characteristics of each fuel additive, and associated calculations of unit demand; and
said controlled variables include at least one of the following: oxygen, secondary air, nitrogen oxide emissions, carbon monoxide emissions, and boiler efficiency.

12. A method for controlling oxygen in flue gas produced by a boiler for a fossil fuel fired power generating unit, said method comprising:
receiving data signals from a plurality of sensors for sensing parameters associated with operation of the power generating unit;
using a model to predict oxygen in the flue gas produced by the boiler, the model comprising:
a plurality of inputs for receiving input values associated with manipulated variables and disturbance variables associated with the power generating unit, and
one or more outputs for providing output values associated with controlled variables, at least one output providing a first output value indicative of predicted oxygen in the flue gas in accordance with the input values;
determining optimal setpoint values for each of the manipulated variables by accessing said model to minimize a cost value of a cost function while observing at least one constraint associated with operation of the power generating unit, said cost value affected by the value for each said manipulated variable, wherein an optimizer determines the optimal setpoint values in accordance with at least one goal and the at least one constraint, said optimal setpoint values producing optimal air flow into the boiler; and
controlling operation of the power generating unit using the optimal setpoint values for the manipulated variables.

13. A method according to claim 12, wherein said model is selected from the group consisting of the following: a neural network model, an empirically developed model, a model developed using "first principles," a support vector machine (SVM) model, a model developed by linear regression and a model based upon heuristics.

14. A method according to claim 12, wherein said optimizer is selected from the group consisting of:
linear programming, quadratic programming, mixed integer non-linear programming (NLP), stochastic programming, global non-linear programming, genetic algorithms, and particle/swarm techniques.

15. A method according to claim 12, wherein said cost value is affected by the value of each said manipulated variable over a plurality of time intervals, said optimizer determining a respective value for each said manipulated variable for the plurality of time intervals in accordance with minimization of said cost value.

16. A method according to claim 15, wherein the respective value of each said manipulated variable for a first time interval of the plurality of time intervals is determined as said respective optimal value for an optimization cycle.

17. A method according to claim 15, wherein said respective value for each said manipulated variable is determined for said plurality of time intervals while observing said at least one constraint across said plurality of time intervals.

18. A method according to claim 12, wherein said cost function and said at least one constraint are determined to prevent flame extinction and flame instability in the boiler of the power generating unit.

19. A method according to claim 12, wherein said cost function and said at least one constraint are determined to counteract the effects of variations in the fossil fuel.

20. A method according to claim 12, wherein said cost function and said at least one constraint are determined to counteract effects of drift in data signals indicative of oxygen concentration generated by oxygen sensors.

21. A method according to claim 12, wherein said at least one constraint includes at least one of the following: a limit on secondary air, a limit on oxygen, a limit on emissions of CO, and a limit on emissions of NOx.

22. A method according to claim 12, wherein
said manipulated variables include at least one of the following: primary air demand, secondary air demand, overfire air demand, forced air fan, primary air fan, forced air fan, induced air fan, exhauster fan, and mill bias;
said disturbance variables include at least one of the following: fuel demand, unit demand, characteristics of fuel blend, characteristics of each fuel additive, and associated calculations of unit demand; and
said controlled variables include at least one of the following: oxygen, secondary air, nitrogen oxide emissions, carbon monoxide emissions, and boiler efficiency.

* * * * *